United States Patent
Storms et al.

(10) Patent No.: US 10,673,871 B2
(45) Date of Patent: Jun. 2, 2020

(54) AUTONOMOUS EDGE DEVICE FOR MONITORING AND THREAT DETECTION

(71) Applicant: New Context Services, Inc., San Francisco, CA (US)

(72) Inventors: Andrew Charles Storms, San Francisco, CA (US); Daniel C. Riedel, San Francisco, CA (US)

(73) Assignee: New Context Services, Inc., San Francisco, CA (US)

(*) Notice: Subject to any disclaimer, the term of this patent is extended or adjusted under 35 U.S.C. 154(b) by 0 days.

(21) Appl. No.: 15/724,957

(22) Filed: Oct. 4, 2017

(65) Prior Publication Data

US 2019/0104138 A1    Apr. 4, 2019

(51) Int. Cl.
*H04L 29/06* (2006.01)

(52) U.S. Cl.
CPC ...... *H04L 63/1416* (2013.01); *H04L 63/1425* (2013.01); *H04L 63/1466* (2013.01)

(58) Field of Classification Search
CPC ............. H04L 63/1416; H04L 63/1466; H04L 63/1425
See application file for complete search history.

(56) References Cited

U.S. PATENT DOCUMENTS

| | | | |
|---|---|---|---|
| 9,130,980 B2 * | 9/2015 | Law | H04L 63/1416 |
| 10,250,619 B1 * | 4/2019 | Park | H04L 63/1416 |
| 2007/0050777 A1 * | 3/2007 | Hutchinson | G06F 11/0709 |
| | | | 718/104 |
| 2007/0143846 A1 * | 6/2007 | Lu | G06F 21/554 |
| | | | 726/23 |
| 2011/0072506 A1 * | 3/2011 | Law | H04L 63/0227 |
| | | | 726/11 |
| 2012/0255019 A1 | 10/2012 | McNamee | |
| 2012/0304007 A1 * | 11/2012 | Hanks | H04L 67/12 |
| | | | 714/26 |

(Continued)

FOREIGN PATENT DOCUMENTS

WO    WO2017105483 A1    6/2017

OTHER PUBLICATIONS

International Search Report and Written Opinion for International Application No. PCT/US2018/054328, dated Dec. 12, 2018, 17 pages.

*Primary Examiner* — Cheng-Feng Huang
(74) *Attorney, Agent, or Firm* — Fish & Richardson P.C.

(57) ABSTRACT

Techniques are described for monitoring an operational technology environment (OTE) to detect threats, and performing actions to respond to detected threats. Edge device(s) are arranged to monitor and/or control the operations of component(s) within an OTE. An edge device stores threat profiles, each including a set of physical indicators that would, if exhibited by sensor data collected from the component, indicate the presence of a particular threat in the OTE. The edge device may collect sensor data from sensor devices situated in or near the monitored component. By comparing the sensor data to the threat profile(s), the edge device determines whether any of the threats described by the threat profiles are currently active. If a threat is detected, the edge device sends an alert message to server computing device(s). In some instances, the edge device can also autonomously perform response or remediation action(s) in response to detecting a threat.

20 Claims, 5 Drawing Sheets

(56) References Cited

U.S. PATENT DOCUMENTS

| | | |
|---|---|---|
| 2013/0305357 A1 | 11/2013 | Ayyagari |
| 2015/0067857 A1* | 3/2015 | Symons .................. G06N 5/043 726/23 |
| 2016/0344754 A1* | 11/2016 | Rayapeta ............ H04L 63/1416 |
| 2017/0201537 A1 | 7/2017 | Caldwell |

* cited by examiner

AUTONOMOUS EDGE DEVICE FOR MONITORING AND THREAT DETECTION

BACKGROUND

Operational technology environments, such as infrastructure grids, utility distribution networks, industrial control systems, and others, are increasingly the target of cyber-attacks that are evolving to become more frequent and/or more sophisticated. Such attacks may have a dramatic negative impact on the provision of public services, public health, and/or the economics of companies or countries. However, detecting attacks is difficult and traditionally requires the review of large datasets and multiple inputs that are outside traditional sensors. Moreover, even traditional methods of dataset review can fail to detect a cyber-attack that employs a new method or channel of attack that has not been observed before, given that traditional monitoring techniques would not know to look for such an evolved attack.

SUMMARY

Implementations of the present disclosure are generally directed to monitoring an operational technology environment to detect attacks or potential attacks. More particularly, implementations of the present disclosure are directed to a system of edge devices and server device(s), in which the edge devices monitor components of an operational technology system to detect cyber-attacks and/or other threats based on threat profiles received from the server device(s), and in which the edge devices are able to detect and respond to detected threats. In some instances, the edge devices operate to detect and respond to threats in an autonomous manner, such as when a network connection to the server device(s) is not available.

In general, implementations of innovative aspects of the subject matter described in this specification can be embodied in a method that includes the following operations: receiving, by an edge computing device, from one or more server computing devices, one or more threat profiles each corresponding to a respective cyber-attack and including one or more physical indicators exhibited by an operational technology environment (OTE) while subjected to the respective cyber-attack; receiving, by the edge computing device, one or more current state values of a component of the OTE monitored by the edge computing device, the one or more current state values generated by one or more sensor devices measuring the one or more current state values of the component; comparing, by the edge computing device, the one or more current state values to respective one or more physical indicators for each of the one or more threat profiles; and in response to detecting a correspondence between the one or more current state values and the respective one or more physical indicators for a threat profile, sending, by the edge computing device, an alert message to the one or more server computing devices indicating that the OTE is being subjected to an active cyber-attack corresponding to the threat profile.

These and other implementations can each optionally include one or more of the following innovative aspects: performing, by the edge computing device, at least one action to respond to the active cyber-attack, the at least one action indicated in the threat profile corresponding to the active cyber-attack; the operations further include receiving, by the edge computing device, from the one or more server computing devices, a message describing at least one action to respond to the active cyber-attack, the message sent by the one or more server computing devices in response to the alert message; the operations further include performing, by the edge computing device, the at least one action to respond to the active cyber-attack; the one or more current state values include at least one measurement, in the respective component, of one or more of current, voltage, power consumption, resistance, impedance, pressure, flow, radar, motion, sound, and/or video; the operations further include communicating, by the edge computing device, the one or more current state values for analysis by the one or more server computing devices, the analysis including correlating the one or more current state values with network traffic in the OTE during a time period when the one or more current state values were generated, and based at least partly on the correlating, designating the one or more current state values as a new threat profile of a potential cyber-attack; the one or more current state values are communicated to the one or more server computing devices based at least partly on a determination that the one or more current state values are anomalous in comparison to one or more typical state values for the respective component; the correlating is based at least partly on a machine learning algorithm; the correlating further includes providing the one or more current states values as input to a model that has been trained, using the machine learning algorithm, to determine the correspondence between the one or more current state values and the threat profile; the one or more current state values are received and compared to the one or more threat profiles in real time with respect to generation of the one or more current state values by the one or more sensor devices; the one or more physical indicators include a threshold value for a physical characteristic of the OTE; and/or detecting the correspondence between the one or more current state values and the one or more physical indicators includes determining that a current state value corresponding to the physical characteristic exceeds the threshold value.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. As described herein, each edge device receives threat profile information from a remote (e.g., cloud, non-cloud, or hybrid) service, the threat profile information describing the physical indicators that may be exhibited by the monitored operational technology environment when it is under cyber-attack. Implementations provide edge device(s) that are able to autonomously perform local operations to collect sensor data and compare the collected sensor data to various threat profiles to determine whether the monitored operational technology system is currently under attack. In some instances, the edge device(s) also take action(s) to respond to a detected threat. Because each edge device is able to perform the sensor data analysis locally, based on the locally stored threat profile information, the edge device is able to operate autonomously and independently of the remote (e.g., cloud) service, such as in instances when a network connection between the edge device and the remote service is slow or unavailable or when the remote service is down. Moreover, by performing the sensor data analysis on the edge device instead of on the remote (e.g., cloud) service, implementations reduce the processing load on the remote service that would otherwise be sustained if all processing was performed on the service. Accordingly, implementations enable a remote service that consumes less processing power, active memory, network bandwidth, and/or other computing resources than would be the case if all processing was performed on the service. In particular, implementations reduce the amount of network communications between the edge device and the remote service, given that sensor data analysis is performed on the edge device. Further, by shifting at least some of the analysis and threat response load to the edge device(s), implementations provide a system that is able to perform analysis and response operations more quickly and efficiently than traditional systems that may centralize operations on a central server or cluster of servers.

Moreover, by performing the sensor data analysis locally on the edge device instead of remotely, the edge device can, in some instances, quickly perform action(s) in response to a detected threat, such as shutting down the component of the operational technology environment that is exhibiting physical characteristics that indicate a cyber-attack is occurring. Because such action(s) can be performed without requiring a network communication round-trip to communicate with the remote service, the edge device can respond to a detected threat more quickly than other monitoring systems in which the data processing and response may be handled exclusively on the server side. This rapid response to a detected threat is performed through the edge devices' execution of algorithms that are (e.g., constantly) tuned and refined. Such algorithms are shared among the various edge devices on the network and are executed on the edge devices. The algorithms may be delivered to the edge devices over a network or through non-network delivery channels.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to devices, methods, and computer-readable media for monitoring an operational technology environment (OTE) to detect threats, including but not limited to cyber-attacks, against the OTE, and performing actions to respond to detected threats. Implementations provide for one or more edge computing devices (also described as edge devices) that are each arranged to monitor and, in some instances, control the operations of a particular component within an OTE. For example, in instances where the OTE is an electric power generation and distribution system (e.g., an electric grid), an edge device may be situated to monitor and/or control a particular substation of the OTE. The edge device may store threat profile information that includes one or more threat profiles, with each threat profile including a set of physical indicators that would, if exhibited by sensor data collected from the component, indicate a particular threat that is currently active in the OTE. The edge device may collect sensor data (e.g., as a feed or stream) from multiple sensor devices of various types situated in or near the monitored component. Accordingly, the sensor data describes a set of current physical characteristics of the monitored component.

By comparing the sensor data to the threat profile(s), the edge device determines whether any of the threats described by the threat profiles are currently active. If a threat is detected, the edge device sends an alert message to one or more server computing device(s). In some instances, the edge device can also autonomously perform response or remediation action(s) in response to detecting a threat, such as shutting down the monitored component, disconnecting the component from a network, and so forth. In this way, implementations provide for automated advance threat detection for an OTE. Implementations also provide for orchestrated remediation in OTE(s), and a hierarchical reporting and sharing structure for data collected within an OTE, as described further below.

An edge device can be configured to monitor various types of activity in, and/or characteristics of, a component (e.g., a substation), and determine whether the activity and/or characteristics indicate that a threat is currently ongoing. The edge device can receive sensor data from sensor devices monitoring various sub-components of the component. Such sub-components can be operational technology (OT) devices related to the operations of the OTE. For example, in an electrical distribution system, the monitored OT devices can include power relays, circuits, generators, and so forth. As another example, in a water distribution system, the monitored OT devices can include values, pumps, flow regulators, and so forth. Sensors may be arranged to monitor the various sub-components, and measure physical characteristics of the sub-components, such as an amount of electric current (e.g., amperage) that is drawn and/or generated, voltage, power consumed and/or generated, resistance, impedance, and/or other physical values in the electrical distribution system. Sensors may also be arranged to measure physical characteristics of a system to distribute, or otherwise manage, water or some other suitable fluid or gas, such characteristics including flow rate, pressure, temperature, loss rate (e.g., due to leakage), and/or other physical values in the fluid or gas distribution system. Sensors may also be arranged to measure and/or detect other characteristics that may be present in the component(s) being monitored, such as the detection of motion, sound, electromagnetic radiation, the presence of objects, and so forth. Sensor(s) may include cameras, microphones, vibration detectors, and/or other device(s) for capturing video data, image(s), audio data, seismic (vibrational and/or motion) data, and so forth. Sensor(s) may also include signal-emitting and/or signal-receiving sensor systems for actively and/or passively detecting the presence, location, and/or movement of objects, such as through the use of RADAR, SONAR, and so forth.

In some implementations, sensor devices may also monitor information technology systems within the monitored component of the OTE, such as firewalls, other network appliances, security information and event management (STEM) systems, human-machine interfaces (HMIs), and so forth. The various sensor data collected from such IT sub-components may also be provided to the edge device monitoring the component. In some implementations, the edge device may also communicate with a historian in the component (e.g., substation). The historian is a data collection device that may be used in OT systems. It captures systems and events and may also capture configuration information. It can also record trends and general historical information about events and devices within the OTE, such as current flow and draw at certain time based intervals.

The edge device may analyze the various sensor data received from the OT and/or IT sub-component sensors, and determine whether the sensor data corresponds to any of the threat profiles. The edge device may, in this way, detect and respond to threats at machine-level speed without the need for a traditional manual operator to detect a threat and initiate countermeasures to respond to the threat.

In some implementations, the threat profiles are communicated to the edge device(s) from one or more server computing devices (also described as server devices, or servers). In some instances, the threat profiles may be received at the server(s) from external entities, such as government agencies and/or other threat monitoring organizations. In some instances, the threat profiles may be created by the server(s) as a characterization of newly discovered threat(s). For example, edge device(s) may detect OTE operational characteristics that are outside a normal or typical range of values for certain sensor-measured values. The edge device(s) may communicate this data to the server(s), which may use the received data to characterize the anomalous behavior as a newly detected threat. For example, the data may be included in a newly created threat profile as a characterization of a threat, such that subsequent observations of such data may be used to determine that the threat has recurred. The new threat profile can be propagated to the edge device(s) with the other threat profile information. The new threat profile can also be provided to the external entities, thus adding to the threat intelligence available for various entities combating threats. Threat profile information can be described and communicated using any suitable data format. For example, the threat profile information can be described using a suitable version of the STIX™ format, and the threat profile information can be transmitted using a suitable version of the TAXII™ format. In some implementations, the system discovers potential threats and shares them with other interested parties over the network, e.g., using the STIX and/or TAXII formats to describe and/or communicate the threat profile information to the other parties.

In some implementations, the edge devices may be described as hardened appliances that are secured against unauthorized access and attacks. The software (e.g., firmware) executing on the edge devices may be built with source code attribution, in secure (e.g., clean room) environments to ensure that the software is not compromised or corrupted with malicious code. The development environment may employ multiple types of authentication and/or authorization to ensure that only authorized personnel have access to the software during development. The binary executable versions of the software may also be verified, on an ongoing basis, as uncorrupted through checks of the binary signature and/or other techniques. The various remediation actions performed by the software (e.g., in response to a detected attack) may be signed and attributed, to ensure that the action(s) are being performed by authorized processes.

In some implementations, the server environment may provide various (e.g., centralized) monitoring and/or reporting capabilities. For example, the server(s) may provide the ability to review the current status (e.g., posture) of the OTE being monitored, as a whole, as well as the various individual components and/or sub-components of the OTE. In some implementations, the server-side software may be executed within a distributed computing (e.g., cloud computing) environment.

OTEs are typically difficult to protect using traditional IT cyber-security tools, given that OTEs can be severely resource-constrained and may be unable to host native monitoring capabilities, such as those required by traditional cyber-security tools. Traditionally, devices are observed by way of external data sources such as output logs, network traffic, data on a HMI, and so forth. The richness that is required to describe those combinations of observed conditions which might indicate a comprise is often difficult to represent in a parsable and machine-executable format.

The implementations described herein provide a mechanism by which a threat, such as a cyber-attack, is detected through measurement of the physical characteristics that are evidence of an ongoing attack, in addition to or instead of measuring the IT-related evidence of such an attack. For example, a cyber-attack that is directed at a OTE, such as an electrical grid, may cause various anomalous physical effects such as heat dissipation, electric current and/or voltage differences, changes in power consumption, and so forth. Observation of these physical characteristics, either alone or in combination, may enable an edge device to detect that a cyber-attack, or some other type of attack, is underway, and trigger the edge device to send an alert message and/or perform actions to halt or combat the attack. Although examples herein may describe detecting cyber-attacks based on the physical effects cause by the attack, implementations are also employable to detect other types of attacks that. generate detectable (e.g., physical) anomalies in systems.

Figure 1:
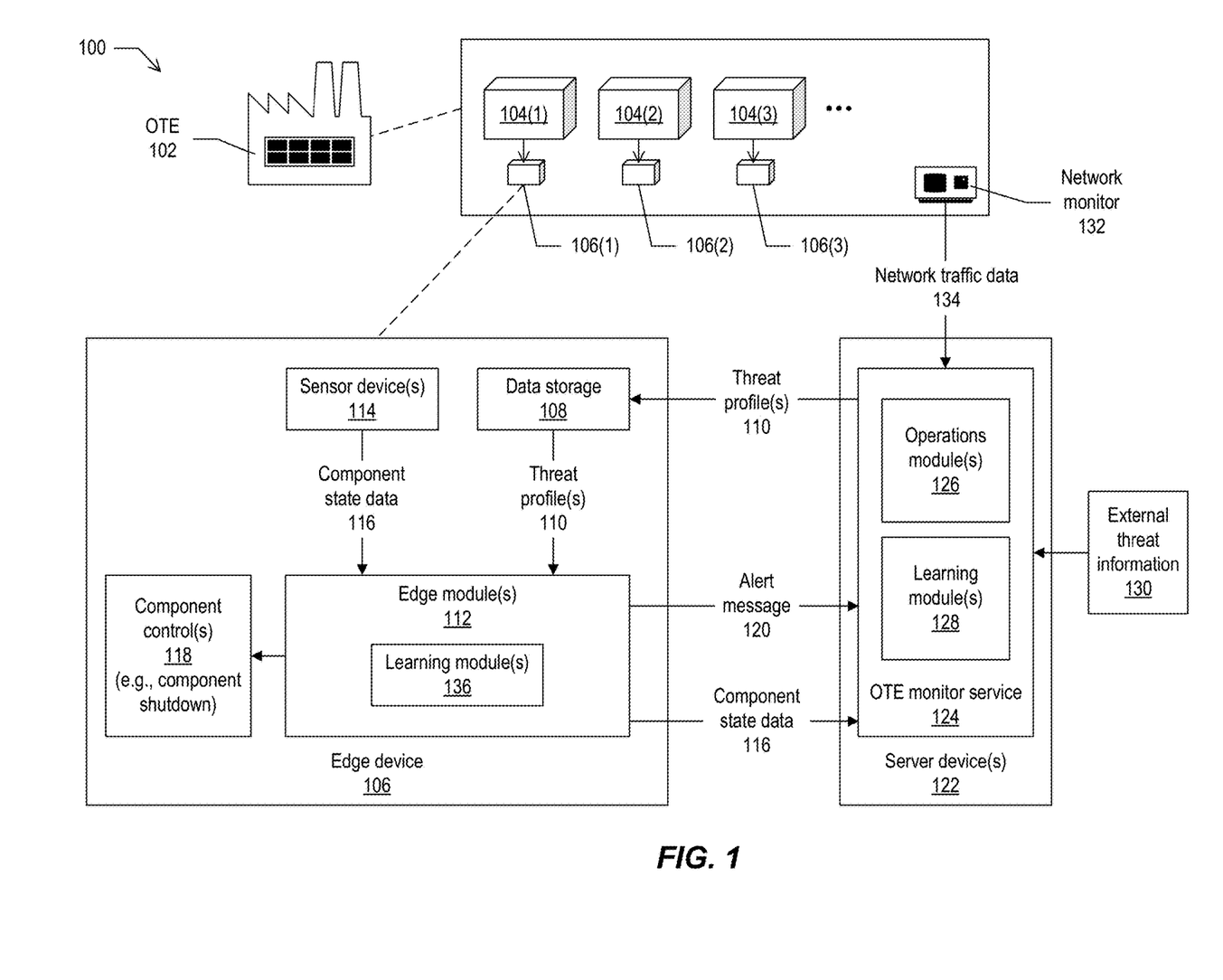
FIG. 1 depicts an example system for monitoring an operational technology environment using one or more edge devices, according to implementations of the present disclosure.

FIG. 1 depicts an example system 100 for monitoring an OTE 102 using one or more edge devices 106, according to implementations of the present disclosure. The OTE 102 can include any suitable number of components 104, one or more of which may be monitored by an edge device 106. The OTE 102 can be a utility grid for generating and/or distributing electric power, water, or gas, for handling sewage or other waste, or other types of utilities. In such instances, the components 104 can include subsystems for generating and/or distributing the power, water, or gas respectively, or for handling the sewage or other waste. For example, for an electrical distribution OTE, the components can include electrical generators, subsystems, and so forth. The OTE 102 can also be an industrial environment that includes various components that are involved in the manufacturing of products. Implementations also support other types of OTEs to be monitored and/or controlled by the edge device(s) 106. The edge device 106 may be physically coupled to, incorporated into, embedded into, or otherwise in proximity to the monitored component 104.

The edge device 106 includes data storage 108, one or more sensor devices 114, and one or more edge modules 112. The data storage 108 may be of any suitable size and format. The sensor device(s) 114, which may also be described as sensor(s) or component sensor(s), can be of any suitable number and type to measure the relevant characteristics of the component 104 that is monitored by the edge device 106. The sensor device(s) 114 can measure various (e.g., physical) characteristics of the component 104 being monitored, and generate component state data 116 that describes a current (or recent) value for each of the measured characteristics. The characteristics that are measured by the sensor(s) for a particular component can depend on the type of component being monitored. For example, for an edge device 106 that monitors a component of a water distribution system, the sensor device(s) 114 may measure physical characteristics of the water flowing through the system, such as flow rate, flow volume, flow duration, water temperature, water pressure, salinity or other chemical composition of the water, particulate concentration, and so forth. As another example, for an edge device 106 that measures electrical supply characteristics of a component in a power distribution system, the sensor device(s) 114 can measure voltage, load, current, power consumption, and so forth. In various types of OTE(s), the edge device(s) 106 may include sensor device(s) 114 to measure the temperature of the monitored component 104, and/or an ambient temperature in proximity to the component 104, e.g., to measure heat dissipation and/or generation from the monitored component. The edge device(s) 106 may also include cameras, microphones, vibration sensors, and/or movement sensors, to capture, respectively, image (or video) data, audio information, vibration data, and/or movement data at or in proximity to the component being monitored.

In some implementations, the component state data 116 is sent to the edge module(s) 112 as a data stream of real-time data collected or otherwise generated by the sensor device(s) 114. The component state data 116 may also be communicated to the edge module(s) 112 in a periodic batch, with any suitable frequency. Although FIG. 1 shows an example in which the sensor device(s) 114 are incorporated into the edge device 106, implementations are not so limited. In some implementations, one or more sensor device(s) 114 may be external to the edge device 106, and may communicate component state data 116 to the edge module(s) 112 over a wired or wireless connection.

The edge module(s) 112 may also be described as firmware, and may be executed by a microcontroller or other sort of processor included in the edge device 106. The edge device 106 may also include transceiver(s) (e.g., network interface controller(s)) configured to receive and send information over one or more networks, such as to communicate with the sensor device(s) 114 and/or server device(s) 122. In some implementations, the edge device 106 includes one or more component controls 116 that (e.g., directly) control the operation of the monitored component 104 and/or OTE 102. For example, the edge device 106 can include a shutoff valve or switch that reduces or stops the flow of water, electricity, gas, air, and/or other relevant substance to, from, or through the monitored component 104, in response to a detected threat against the monitored component 104 and/or OTE 102. As another example, the edge device 106 can include a shutoff control that shuts off, powers down, or otherwise disables the monitored component 104 and/or OTE 102 in response to a detected threat.

In some implementations, the data storage 108 stores one or more threat profiles 110 that each correspond to, and describe the effects of, a particular threat that may be launched against the OTE 102 and/or its components 104. Each threat profile 110 may include a set of one or more physical indicators that the threat, such as a cyber-attack, is currently being performed (or was recently performed) against the monitored OTE 102 and/or its components 104. For example, a particular type of cyber-attack may be recognized based on its physical effects in the OTE, such as increased temperature in various components, an increase in current and/or voltage, and so forth. The edge module(s) 112 may receive the current component state data 116 for the monitored component, and compare the state data 116 to the various threat profile(s) 110 to determine whether the state data 116 corresponds to any of the threat profile(s) 110. If a correspondence is identified, the edge module(s) 112 may send an alert message 120 to an OTE monitor service 124 executing on one or more server device(s) 122. The alert message 120 may indicate the particular threat(s) that have been detected in the component 104 based on the state data 116 corresponding to the respective threat profile(s) 110 of the threat(s). In some instances, the edge module(s) 112 may perform other action(s) in response to detecting a threat, such as sending signal(s) to the component control(s) 118 to shut down the component and/or perform other actions as a counter-measure to the threat.

The server device(s) 122, also described as server computing device(s), can include any suitable number and type of computing device(s). In some implementations, the server device(s) 122 are distributed computing devices or cloud servers, and the OTE monitor service 124 can be described as a cloud service. In some implementations, the OTE monitor service 124 includes one or more operations modules 126. The operations module(s) 126 may perform actions in response to a detected threat in the monitored OTE 102 or its components 104. Such actions may be performed automatically in some instances. The operations module(s) 126 may also output information to one or more monitors to enable operators a view of the current state of the monitored OTE. Such monitors may display threat information for ongoing threats, and may enable an operator to specify and initiate actions to be taken in response to a threat, such as OTE and/or component shutdown, taking the OTE and/or particular components off of a network, and so forth. The monitors may include functionality for reporting the state of the OTE to various individuals and/or entities, displaying an overall posture (e.g., status) of the monitored OTE, and/or providing for command and control of the OTE and/or its various components.

In some implementations, the OTE monitor service 124 includes one or more learning modules 128 that apply machine learning technique(s) for analytics, classification, deep learning, neural networks, and so forth. In some implementations, the learning module(s) 128 apply suitable machine learning (ML) and/or artificial intelligence (AI) techniques to generate new threat profiles 110 based on the component state data 116 generated by the edge device(s) 106. The edge device 106 may communicate the component state data 116, over one or more networks, to the OTE monitor service 124 running on the server device(s) 122. The state data 116 can be communicated from the edge device(s) 106 to the OTE monitor service 124 in real time as the state data 116 is received from the sensor device(s) 114, or in a periodic (e.g., daily) batch upload to the OTE monitor service 124. The learning module(s) 128 can apply a machine learning algorithm to the state data 116, and determine whether the state data 116 indicates a new type of threat. For example, the learning module(s) 128 can apply a machine learning trained model that identifies correlations between anomalous state data 116 (e.g., state data that is outside a typical, normal, and/or expect range of values) that describes physical OT characteristics of the monitored system, and anomalous state data 116 that describes IT characteristics (e.g., network traffic characteristics) of the monitored system. In some instances, a correlation between anomalous OT and IT behavior within a system may indicate a new type of cyber-attack, or other attack, that is causing physical effect(s) that are manifested in the OT subsystems of the monitored environment, and that can be detected and quantified by the sensor device(s) 114 monitoring the environment. The learning module(s) 128 may generate a new threat profile 110 for the newly identified type of threat, and the new threat profile 110 may be downloaded to the various edge device(s) 106 for subsequent monitoring. The new threat profile 110 may also be provided to various external entities that are also involved in threat detection and characterization. In this way, implementations provided for a learning mechanism that can adapt to an evolving threat environment, and respond to newly identified types of threats (e.g., new forms of cyber-attack) that cause physical effects within an OTE.

In some implementations, the sensor device(s) 114 in the edge device(s) 106 include sensors to monitor IT components, such as network traffic monitors, sensors that characterize and/or identify the source of network traffic, and so forth. In such instances, the component state data 116 that is communicated to the OTE monitor service 124 may include IT component information as well as OT component information. In some implementations, the IT information may be received as network traffic data 134 that is communicated to the OTE monitor service 124 from a network monitor 132 that is a component of the monitored OTE 102. Accordingly, the IT component state data may be for the OTE 102 as a whole and/or for the individual components 104 of the OTE 102.

In some implementations, the OTE monitor service 124 may receive external threat information 130 from one or more external entities, such as government agencies and/or private entities that track and characterize cyber-attack data or data for other types of attacks. The external threat information 110 may be provided, as one or more threat profile(s) 110, to the edge device(s) 106. In some instances, the threat profile(s) 110 that are communicated to the edge device(s) 106, and/or that are generated by the learning module(s) 128, and arranged in a particular format, such as a version of the STIX format. In instances where the external threat information 130 is not already in such a format, the OTE monitor service 124 may translate the incoming external threat information 130 into one or more threat profiles 110 described in the desired format.

As used herein, a real time operation may describe an operation that is performed based on triggering event and without any intentional delay between the performed operation and the triggering event, taking into account the processing and/or communication limitations of the computing system(s) performing the operation and the time needed to initiate and/or perform the operation. The triggering event may be a received communication, a detection of a particular application state, another operation performed by the same or a different process, and so forth. A real time operation may also be described as a dynamic operation. Real time operations may include operations that are automatically executed in response to the triggering event without requiring human input. In some examples, a real time operation may be performed within a same execution path as a process that detects and/or handles the triggering event. For example, the real time operation may be performed or initiated by code that executes as part of the handling of the event and/or in response to a message that is sent as part of the handling of the event. A real time operation may, in at least some instances, be performed synchronously with respect to the triggering event.

In some implementations, the receipt and analysis (e.g., comparison to threat profile(s)) of the component state data 116, by the edge module(s) 112, is performed in real time with respect to the generation of the state data 116 by the sensor device(s) 114, such that the edge module(s) 112 identify any currently active threats against the monitored component and/or OTE. In some implementations, the state data 116 is communicated to the OTE monitor service 124 in real time as the state data 116 is received by the edge module(s) 112. In some instances, the state data 116 is communicated to the OTE monitor service 124 in response to a determination, by the edge module(s) 112, that the state data 116 is outside a typical or normal range of values for particular component characteristics. For example, an electric current draw that is outside (e.g., higher than, lower than) a typical range for such a characteristic in a component can prompt the edge module(s) 112 to send a particular time batch of component state data 116 to the OTE monitor service 124 for analysis by the learning module(s) 128.

The OTE monitor service 124 (e.g., a cloud environment) may perform operations to characterize threats, or receive threats characterized by external entities, and provide the threat profiles to enable the edge device(s) to detect the threat as they manifest themselves through detectable physical effects within the monitored OTE. Accordingly, the edge device(s) 106 may have a network connection to the OTE monitor service 124 to receive periodic updates of threat profiles. Because the edge device(s) are able, in some instances, to take actions themselves in response to a detected threat, the edge device(s) may continue to operate even when the network connection with the OTE monitor service 124 is interrupted or weak. In such instances, the edge device(s) continue to monitor for threats based on the last set of threat profiles received from the OTE monitor service 124, and the edge device(s) may perform actions (e.g., signals to the component control(s)) in response to a detected threat, even while out of communication with the OTE monitor service 124. In this way, the edge device(s) 106 may be described as autonomous or at least semi-autonomous, and are able to act independently of the server device(s) 122 in at least some scenarios.

In some implementations, the edge device(s) 106 and/or server device(s) 122 may be hardened (e.g., secured) against attacks or other unauthorized access, to prevent these systems themselves from becoming threat vectors that are vulnerable to attacks. In some implementations, the edge device(s) 106 themselves may be monitored for anomalous behavior that may be indicative of an attack. The other components of the OTE may also be monitored, such as the historian, the HMI, and so forth. As described above, software running on the edge device(s) 106 and/or server device(s) 122 may be built in a wholly attributed, secure environment to ensure confidence in the generated code and to provide full end-to-end attribution of the code throughout its lifecycle.

In some implementations, a hierarchical reporting and sharing structure is employed for the component state data 116 generated by the sensor device(s) 114. For example, the state data 116 may be collected at multiple tiers of a hierarchy of components within an OTE, such as from a component, sub-component(s) of that component, further sub-component(s) of sub-components, and so forth to any appropriate number of levels within a hierarchical arrangement of components. The state data 116 that is generated from the hierarchy of components may be arranged in its own hierarchy that mirrors that of the components, with higher level state data for higher level components include lower level state data for lower level components, and so forth. In some implementations, various log data management tools may be used to organize the hierarchical state data, such as a suitable version of ELK, Splunk, or other types of tools.

Implementations support the use of AI and/or ML techniques, such as neural network techniques or other techniques including those described herein, for analyzing data on the edge device(s), the server device(s), or both the edge device(s) and server device(s). ML may be applied through the learning module(s) 128 executing on the server device(s) 122, through learning module(s) 136 executing as one or more of the edge module(s) 112 on the edge device 106, or both on the server device(s) 122 and the edge device 106. In some implementations, AI and/or ML techniques are employed for micro data analysis on the edge devices, to examine data collected by a particular edge device, identify patterns or behavior exhibited by the data, and determine the presence of a threat based on such patterns or behavior. The edge device can then take actions to mitigate the threat and/or notify the server device(s) and/or other edge device(s) that a threat has been identified. AI and/or ML techniques can also be used for macro data analysis on the server device(s) (e.g., cloud server(s), non-cloud computers, or hybrid systems). On the server device(s), data from multiple edge devices can be aggregated and analyzed to identify broader patterns, trends, and/or behaviors that may not be identifiable through analysis of data from a single edge device, but that may manifest across a collection of edge devices in an OTE or multiple OTEs. Such patterns, trends, and/or behaviors can be used to identify the presence of threats, and action(s) may be taken to mitigate the threat(s). The analysis may also provide a characterization of threats, e.g., in the threat profile information, that can be propagated down to the edge devices to enable such device(s) to identify the threat(s) in the future, based on the subset of data that is measurable at the edge device.

Figure 2:
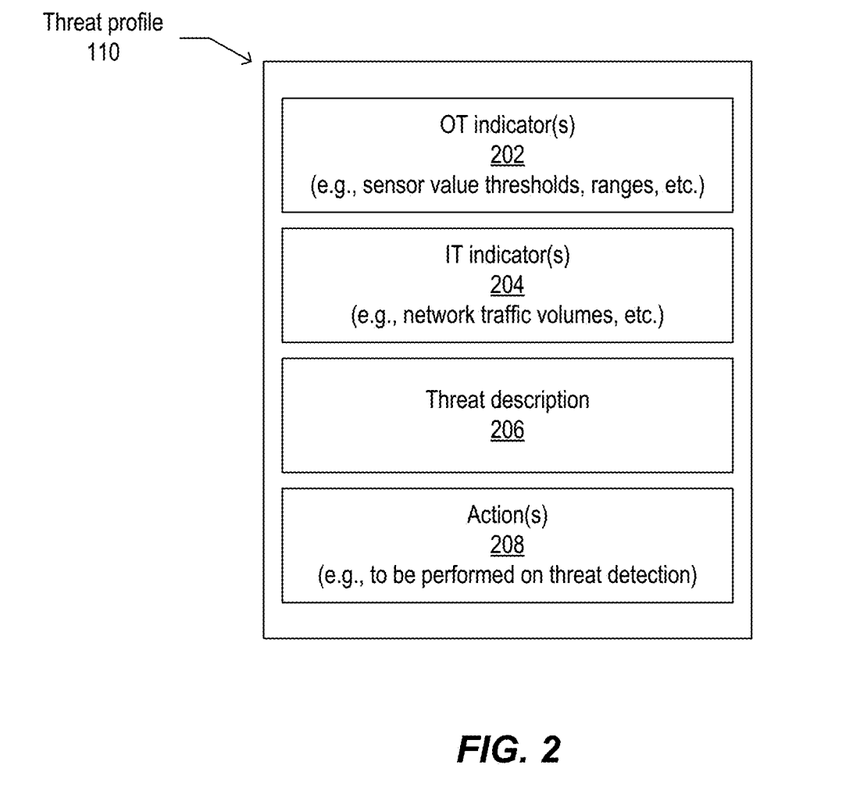
FIG. 2 depicts an example of threat profile information to be used for monitoring an operational technology environment, according to implementations of the present disclosure.

FIG. 2 depicts an example of threat profile 110 to be used for monitoring an OTE 102, according to implementations of the present disclosure. In some implementations, the threat profile 110 is described using a particular data format, such as a version of TAXII, STIX, or other suitable format.

The threat profile 110 may include a list of one or more OT indicators 202 and/or one or more IT indicators 204. Each OT or IT indicator may be a particular value or range of values, for a particular measured OT or IT characteristic, where the particular value or range of values indicates the presence of a threat. In some instances, an indicator may be a threshold value defining a lower (or upper) bound, such that a measured characteristic beyond the threshold indicates an ongoing threat. The threat profile 110 may include any appropriate number of OT indicators 202 each corresponding to a measured characteristic, such as an electric current draw, voltage, power consumption, liquid flow rate, liquid temperature, liquid pressure, ambient sound volume, ambient light level, ambient temperature, heat dissipation, and so forth. OT indicators 202 may also be described as physical indicators, given that an OT indicator corresponds to a measured physical characteristic such as current, voltage, flow rate, heat dissipation, and so forth. The IT indicator(s) 204 may describe a cyber characterization of a threat, such as network traffic volumes, traffic patterns, particular IP addresses and/or ranges of addresses that are indicative of a threat, particular mechanisms for an attack (e.g., phishing emails, etc.), and so forth.

The threat profile 110 may include a threat description 206 that describes the threat (e.g., the cyber-attack), including its possible origin, known attack patterns, previous known attacks in which the threat was used, variations of the threat, physical evidence and/or effects of the threat, commentary on the threat, sources to learn more about the threat, malware associated with the attack, and so forth. The threat profile 110 may also include one or more actions 208 to be performed (e.g., by the edge device(s)) in response to detecting the particular threat. Action(s) 208 may include sending alert message(s) as described above, and/or taking remediating actions such as shutting down components, removing components from a network, closing or opening relays, loading or changing code executing on processors, changing configuration settings on substations, flashing a system back to a known good state, and so forth.

Figure 3:
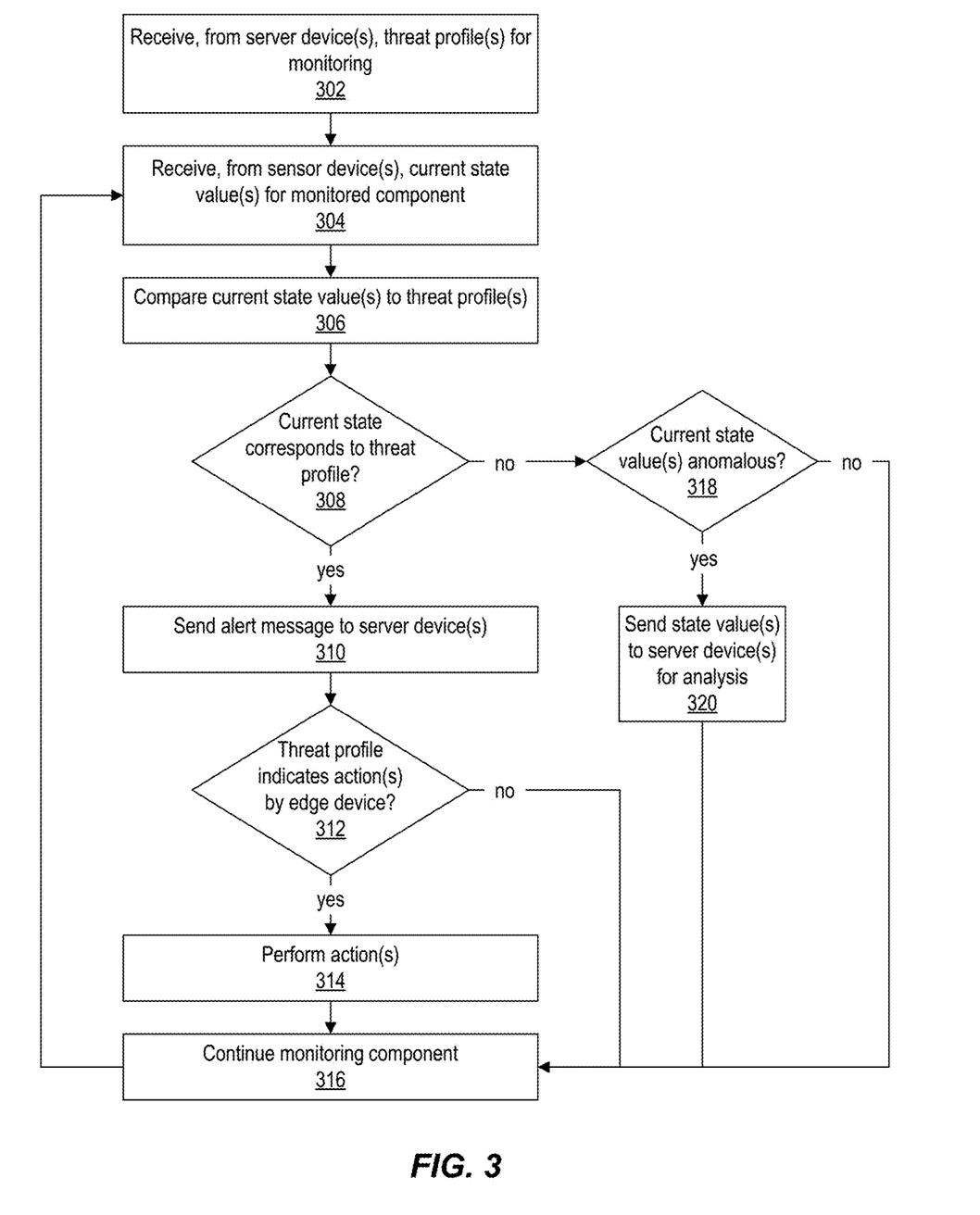
FIG. 3 depicts a flow diagram of an example process for monitoring an operational technology environment, according to implementations of the present disclosure.

FIG. 3 depicts a flow diagram of an example process for monitoring an operational technology environment, according to implementations of the present disclosure. Operations of the process can be performed by one or more of the edge module(s) 112, the OTE monitor service 124, the operations module(s) 126, the learning module(s) 128, and/or other software module(s) executing on the edge device(s) 106, the server device(s) 122, or elsewhere.

The edge device may receive (302), from the server device(s), one or more threat profiles for use in monitoring a component of the OTE. The threat profile(s) may be stored in data storage on the edge device, on in external data storage that is accessible over one or more networks.

Current state data, including one or more current state values, are received (304) from the sensor device(s) associated with the edge device. As described above, the current state value(s) are measured value(s) of one or more OT and/or IT characteristics of the monitored component.

The current state value(s) are compared (306) to the threat profile(s) to determine (308) if there is a correspondence between the state value(s) and any of the threat profile(s), which may indicate a threat that is currently ongoing against the monitored component and/or the OTE as a whole. If there is a correspondence between a threat profile and the current state values, an alert message may be sent (310) to the server device(s). If (312) the threat profile indicates further actions(s) to be taken by the edge device, those action(s) are performed (314), and the edge device may continue monitoring the component (316). If the threat profile indicates no further actions, beyond sending the alert message, the monitoring may continue (316).

If the determination is made (308) that the current state does not correspond to any of the threat profiles, in some implementations, the current state value(s) may be examined (318) to determine whether they are anomalous (e.g., outside a range of typical and/or normal values). If so, the state value(s) may be communicated (320) to the server device(s), for analysis by the learning module(s) as described above. If not, monitoring may continue (316).

Figure 4:
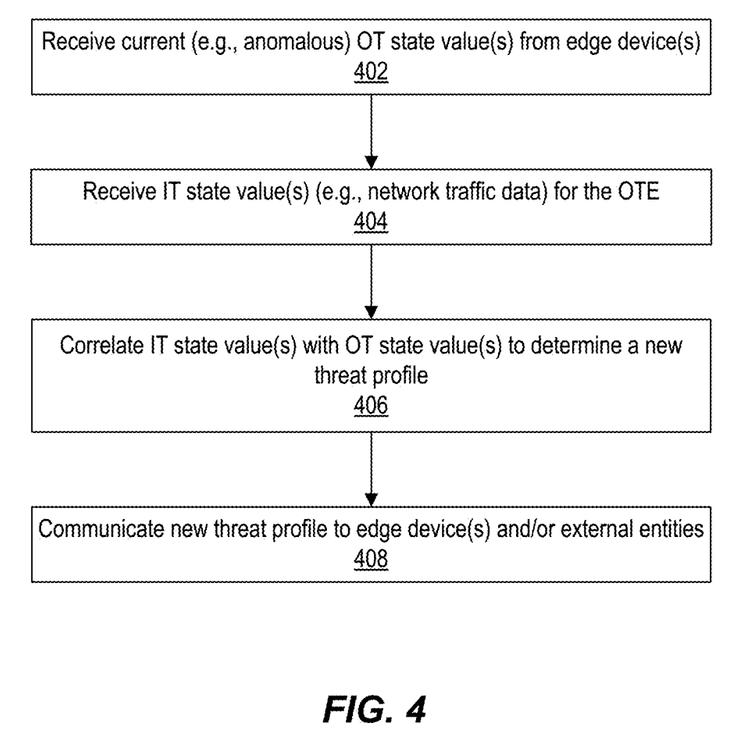
FIG. 4 depicts a flow diagram of an example process for updating threat profile data, according to implementations of the present disclosure.

FIG. 4 depicts a flow diagram of an example process for updating threat profile data, according to implementations of the present disclosure. Operations of the process can be performed by one or more of the edge module(s) 112, the OTE monitor service 124, the operations module(s) 126, the learning module(s) 128, and/or other software module(s) executing on the edge device(s) 106, the server device(s) 122, or elsewhere.

The current state value(s) are received (402) from the edge device(s). As described above, in some implementations the edge device(s) may send the state value(s) to the server device(s) in instances where the state values are determined to be anomalous. The communicated state value(s) may include measured OT value(s). IT state value(s), such as network traffic data, may also be received (404). The IT state value(s) may describe network traffic and/or other IT characteristics of the OTE during a time period in which the OT state value(s) were collected. As described above, the IT state value(s) may be received from the edge device(s), e.g., with the OT state value(s), or the IT state value(s) may be received in a separate stream or other upload from a network monitor in the OTE. The OT state value(s) may be correlated with the IT state value(s) (406) to determine a new threat profile. As described above, such correlation may be performed using an appropriate machine learning technique. The new threat profile is communicated (408) to the edge device(s) for ongoing monitoring. The new threat profile may also be communicated to one or more external entities, including government and/or private entities that are engaged in threat detection and/or characterization activities. In some implementations, machine learning identifies new threat profiles by examining a past history of events and/or actions, and learning to perform automated responses based on patterns present in the history. The machine learning can also learn by analyzing behaviors of human operators, and extrapolating new, automated actions to be performed based on such behaviors. In this way, machine learning can distinguish between normal (e.g., typical, acceptable) events and abnormal (e.g., atypical) events that merit actions in response to the events.

Although examples herein describe operations that are performed on the edge devices and/or server devices, in some implementations the various operations are performed by software that is executing within a virtual machine (VM) that is itself executing on some computing device.

Figure 5:
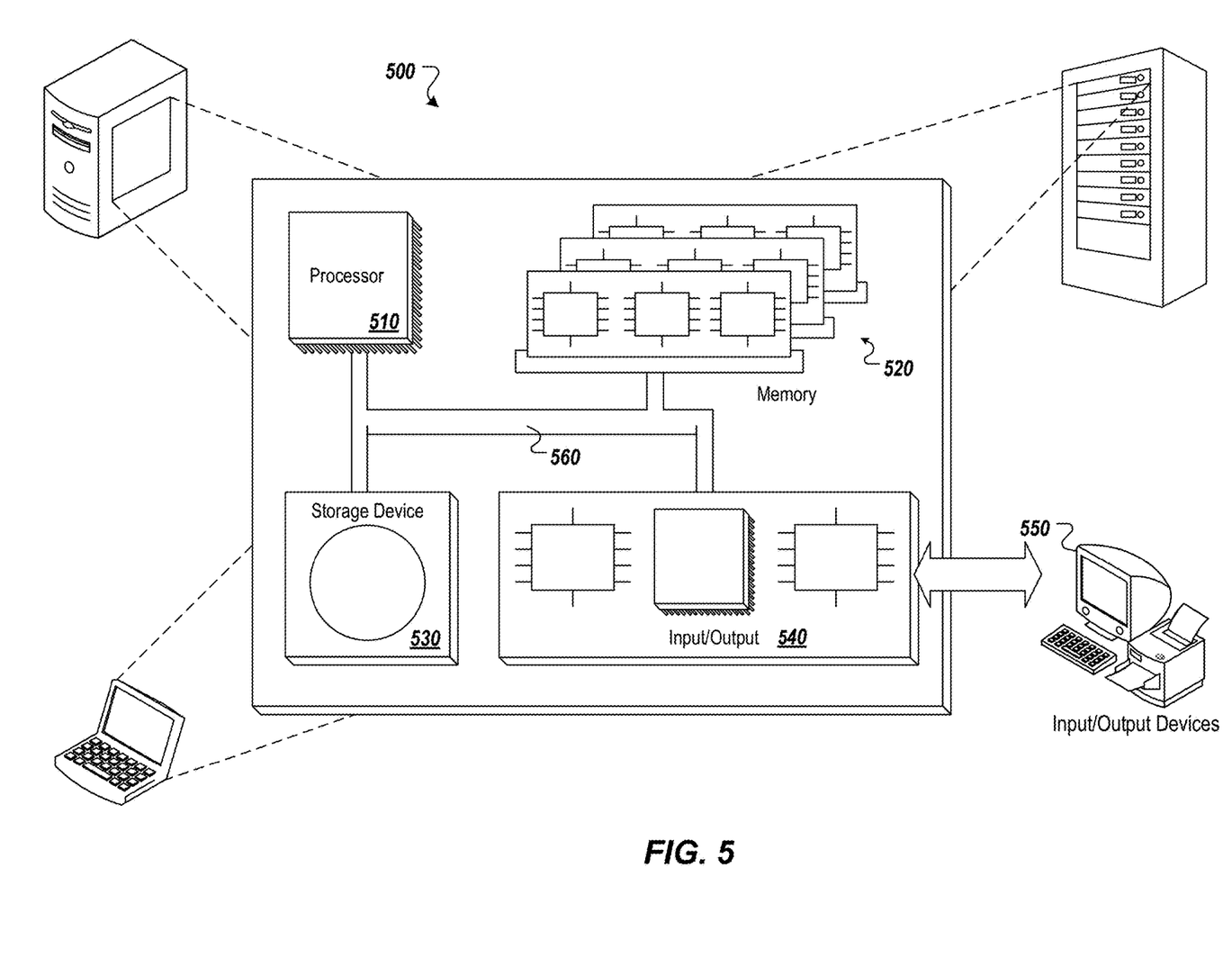
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the OTE 102, the component(s) 104, the edge device(s) 106, the server device(s) 122, and/or other computing device(s) or computing system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks.

However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system for monitoring an operational technology environment (OTE), the system comprising:
   one or more edge computing devices communicatively coupled, at least intermittently, to one or more server computing devices, each respective edge computing device monitoring a respective component of the OTE, each respective edge computing device executing one or more edge modules that perform operations comprising:
      receiving, from the one or more server computing devices, one or more threat profiles, each threat profile of the one or more threat profiles corresponding to a particular type of cyber-attack and including one or more physical indicators exhibited by the OTE while subjected to the particular type of cyber-attack;
      receiving one or more current state values of the respective component monitored by the respective edge computing device, the one or more current state values generated by one or more sensor devices measuring the one or more current state values of the respective component, wherein the component is part of a hierarchy of components;
      generating a hierarchical report comprising the one or more current state values, the hierarchical report being based, at least in part, on the hierarchy of components;
      receiving, by the edge computing device, data from a historian of the component comprising at least one of configuration information related to the component, historical information related to the component, and trend information related to the component, wherein the historian comprises a data collection device;
      comparing the one or more current state values to respective one or more physical indicators for each of the one or more threat profiles;
      in response to detecting a correspondence between the one or more current state values and the respective one or more physical indicators for a particular threat profile of the one or more threat profiles, sending an alert message to the one or more server computing devices indicating that the OTE is being subjected to an active cyber-attack of the particular type corresponding to the particular threat profile;
      receiving, by the edge computing device from the one or more server computing devices, a message describing at least one action to respond to the active cyber-attack, the message sent by the one or more server computing devices in response to the alert message; and in response to receiving the message from the one or more server computing devices, performing the at least one action to respond to the active cyber-attack; and communicating the one or more current state values for analysis by the one or more server computing devices, the analysis including:

correlating the one or more current state values with network traffic in the OTE during a time period when the one or more current state values were generated; and based at least partly on the correlating, designating the one or more current state values as a new threat profile of a potential cyber-attack;

wherein the one or more current state values are received and compared to the one or more threat profiles in real time with respect to generation of the one or more current state values by the one or more sensor devices.

2. The system of claim 1, the operations further comprising:

performing at least one action to respond to the active cyber-attack, the at least one action indicated in the particular threat profile corresponding to the active cyber-attack.

3. The system of claim 1, wherein the one or more current state values include at least one measurement, in the respective component, of one or more of current, voltage, power consumption, resistance, impedance, pressure, flow, radar, motion, sound, and video.

4. The system of claim 1, wherein the one or more current state values are communicated to the one or more server computing devices based at least partly on a determination that the one or more current state values are anomalous in comparison to one or more typical state values for the respective component.

5. The system of claim 1, wherein the correlating is based at least partly on a machine learning algorithm.

6. The system of claim 5, wherein the correlating further comprises providing the one or more current state values as input to a model that has been trained, using the machine learning algorithm, to determine the correspondence between the one or more current state values and the threat profile.

7. The system of claim 1, wherein:

the one or more physical indicators include a threshold value for a physical characteristic of the OTE; and detecting the correspondence between the one or more current state values and the one or more physical indicators includes determining that a current state value corresponding to the physical characteristic exceeds the threshold value.

8. A computer-implemented method performed by an edge computing device, the method comprising:

receiving, by the edge computing device, from one or more server computing devices, one or more threat profiles, each threat profile of the one or more threat profiles corresponding to a particular type of cyber-attack and including one or more physical indicators exhibited by an operational technology environment (OTE) while subjected to the particular type of cyber-attack;

receiving, by the edge computing device, one or more current state values of a component of the OTE monitored by the edge computing device, the one or more current state values generated by one or more sensor devices measuring the one or more current state values of the component, wherein the component is part of a hierarchy of components;

generating a hierarchical report comprising the one or more current state values, the hierarchical report being based, at least in part, on the hierarchy of components;

receiving, by the edge computing device, data from a historian of the component comprising at least one of configuration information related to the component, historical information related to the component, and trend information related to the component, wherein the historian comprises a data collection device;

comparing, by the edge computing device, the one or more current state values to respective one or more physical indicators for each of the one or more threat profiles; and in response to detecting a correspondence between the one or more current state values and the respective one or more physical indicators for a particular threat profile of the one or more threat profiles, sending, by the edge computing device, an alert message to the one or more server computing devices indicating that the OTE is being subjected to an active cyber-attack of the particular type corresponding to the particular threat profile;

receiving, by the edge computing device from the one or more server computing devices, a message describing at least one action to respond to the active cyber-attack, the message sent by the one or more server computing devices in response to the alert message; and in response to receiving the message from the one or more server computing devices, performing the at least one action to respond to the active cyber-attack; and communicating, by the edge computing device, the one or more current state values for analysis by the one or more server computing devices, the analysis including:

correlating the one or more current state values with network traffic in the OTE during a time period when the one or more current state values were generated; and based at least partly on the correlating, designating the one or more current state values as a new threat profile of a potential cyber-attack;

wherein the one or more current state values are received and compared to the one or more threat profiles in real time with respect to generation of the one or more current state values by the one or more sensor devices.

9. The method of claim 8, further comprising:

performing, by the edge computing device, at least one action to respond to the active cyber-attack, the at least one action indicated in the particular threat profile corresponding to the active cyber-attack.

10. The method of claim 8, wherein the one or more current state values include at least one measurement, in the component, of one or more of current, voltage, power consumption, resistance, impedance, pressure, flow, radar, motion, sound, and video.

11. The method of claim 8, wherein the one or more current state values are communicated to the one or more server computing devices based at least partly on a determination that the one or more current state values are anomalous in comparison to one or more typical state values for the component.

12. The method of claim 8, wherein the correlating is based at least partly on a machine learning algorithm.

13. The method of claim 8, wherein:
the one or more physical indicators include a threshold value for a physical characteristic of the OTE; and
detecting the correspondence between the one or more current state values and the one or more physical indicators includes determining that a current state value corresponding to the physical characteristic exceeds the threshold value.

14. One or more non-transitory computer-readable storage media storing instructions which, when executed, cause an edge computing device to perform operations comprising:
receiving, by the edge computing device, from one or more server computing devices, one or more threat profiles, each threat profile of the one or more threat profiles corresponding to a particular type of cyber-attack and including one or more physical indicators exhibited by an operational technology environment (OTE) while subjected to the particular type of cyber-attack;
receiving, by the edge computing device, one or more current state values of a component of the OTE monitored by the edge computing device, the one or more current state values generated by one or more sensor devices measuring the one or more current state values of the component, wherein the component is part of a hierarchy of components;
generating a hierarchical report comprising the one or more current state values, the hierarchical report being based, at least in part, on the hierarchy of components;
receiving, by the edge computing device, data from a historian of the component comprising at least one of configuration information related to the component, historical information related to the component, and trend information related to the component, wherein the historian comprises a data collection device;
comparing, by the edge computing device, the one or more current state values to respective one or more physical indicators for each of the one or more threat profiles;
in response to detecting a correspondence between the one or more current state values and the respective one or more physical indicators for a particular threat profile of the one or more threat profiles, sending, by the edge computing device, an alert message to the one or more server computing devices indicating that the OTE is being subjected to an active cyber-attack of the particular type corresponding to the particular threat profile;
receiving, by the edge computing device from the one or more server computing devices, a message describing at least one action to respond to the active cyber-attack, the message sent by the one or more server computing devices in response to the alert message;
in response to receiving the message from the one or more server computing devices, performing the at least one action to respond to the active cyber-attack; and
communicating the one or more current state values for analysis by the one or more server computing devices, the analysis including:
correlating the one or more current state values with network traffic in the OTE during a time period when the one or more current state values were generated; and
based at least partly on the correlating, designating the one or more current state values as a new threat profile of a potential cyber-attack;
wherein the one or more current state values are received and compared to the one or more threat profiles in real time with respect to generation of the one or more current state values by the one or more sensor devices.

15. The one or more non-transitory computer-readable storage media of claim 14, the operations further comprising:
performing at least one action to respond to the active cyber-attack, the at least one action indicated in the particular threat profile corresponding to the active cyber-attack.

16. The one or more non-transitory computer-readable storage media of claim 14, wherein the one or more current state values include at least one measurement, in the respective component, of one or more of current, voltage, power consumption, resistance, impedance, pressure, flow, radar, motion, sound, and video.

17. The one or more non-transitory computer-readable storage media of claim 14, wherein the one or more current state values are communicated to the one or more server computing devices based at least partly on a determination that the one or more current state values are anomalous in comparison to one or more typical state values for the respective component.

18. The one or more non-transitory computer-readable storage media of claim 14, wherein the correlating is based at least partly on a machine learning algorithm.

19. The one or more non-transitory computer-readable storage media of claim 18, wherein the correlating further comprises providing the one or more current state values as input to a model that has been trained, using the machine learning algorithm, to determine the correspondence between the one or more current state values and the threat profile.

20. The one or more non-transitory computer-readable storage media of claim 14, wherein:
the one or more physical indicators include a threshold value for a physical characteristic of the OTE; and
detecting the correspondence between the one or more current state values and the one or more physical indicators includes determining that a current state value corresponding to the physical characteristic exceeds the threshold value.

* * * * *

UNITED STATES PATENT AND TRADEMARK OFFICE
CERTIFICATE OF CORRECTION

PATENT NO. : 10,673,871 B2
APPLICATION NO. : 15/724957
DATED : June 2, 2020
INVENTOR(S) : Andrew Charles Storms and Daniel C. Riedel

Page 1 of 1

It is certified that error appears in the above-identified patent and that said Letters Patent is hereby corrected as shown below:

In the Claims

Column 20, Line 16, Claim 8, please delete "and" after "profiles;"

Signed and Sealed this
Fourth Day of August, 2020

Andrei Iancu
*Director of the United States Patent and Trademark Office*